United States Patent [19]

Davies et al.

[11] Patent Number: 4,972,161
[45] Date of Patent: Nov. 20, 1990

[54] CLOCK RECOVERY FOR SERIAL DATA COMMUNICATIONS SYSTEM

[75] Inventors: David C. Davies, Chelmsford; Donald G. Vonada, Stow, both of Mass.

[73] Assignee: Digital Equipment Corporation, Maynard, Mass.

[21] Appl. No.: 372,683

[22] Filed: Jun. 28, 1989

[51] Int. Cl.⁵ ............................................ H03L 7/089
[52] U.S. Cl. ...................................... 331/1 A; 331/14; 331/17; 331/27; 328/155; 375/120
[58] Field of Search .................... 331/1 A, 14, 17, 25, 331/27; 328/155; 375/120

[56] References Cited

U.S. PATENT DOCUMENTS

| | | | |
|---|---|---|---|
| 3,813,604 | 5/1974 | Denoncourt | 331/27 X |
| 4,080,576 | 3/1978 | Huber et al. | 331/27 X |
| 4,450,572 | 5/1984 | Stewart et al. | 375/87 |
| 4,535,459 | 8/1985 | Hogge, Jr. | 375/80 |
| 4,774,480 | 9/1988 | Sato et al. | 331/27 X |

*Primary Examiner*—Siegfried H. Grimm
*Attorney, Agent, or Firm*—Arnold, White & Durkee

[57] ABSTRACT

In a serial data communications system, an embedded clock is recovered from a data signal by incrementally controlling the frequency (thus phase) of a voltage-controlled oscillator in response to the difference in phase between the incoming data signal and the clock oscillator output. A transition of the data signal is detected and used to initiate a control pulse which is terminated upon the next transition in the clock oscillator output. A reference pulse is also generated which has a width about equal to a half cycle of the clock. These pulses are used to generate the voltage control for the oscillator, so that the phase relationship varies to see an equilibrium where the pulses are of equal width and the transitions of the clock are at midpoint of potential transitions of the data signal. The control can tolerate relatively long periods where there is no transition of the data signal. The control circuitry includes a counter for counting transitions of the clock to inhibit another detect operation from starting until three transitions after one has begun.

25 Claims, 3 Drawing Sheets

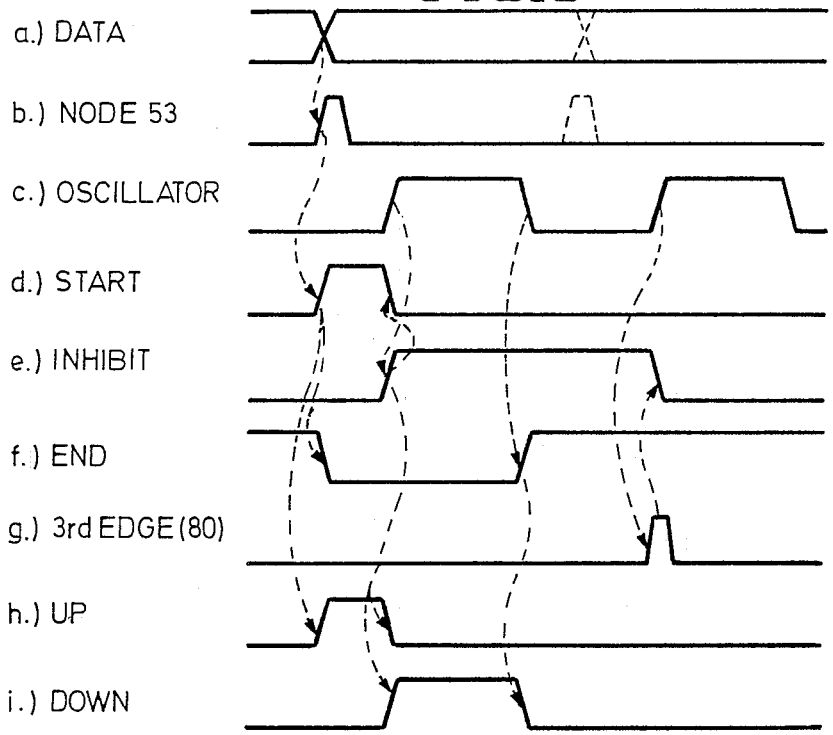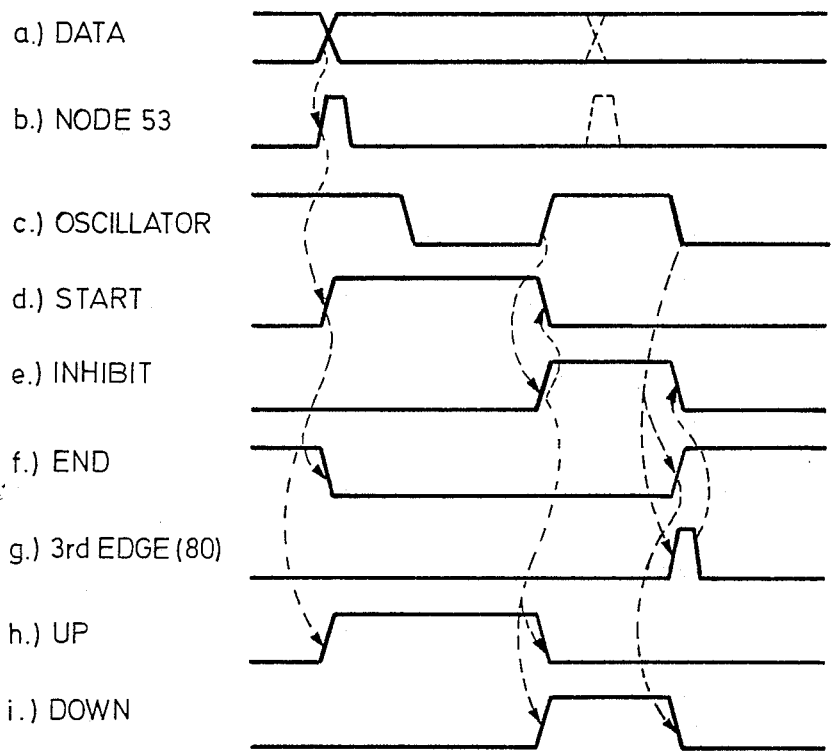

CLOCK RECOVERY FOR SERIAL DATA COMMUNICATIONS SYSTEM

BACKGROUND OF THE INVENTION

This invention relates to data communication systems, and more particularly to a clock-recovery technique for a serial data transmission system.

In U.S. Pat. Nos. 4,897,833, 4,887,076, 4,845,722, 4,777,595, 4,560,985, and 4,490,785, all assigned to Digital Equipment Corporation, assignee of this invention, computer interconnect systems are shown of the type employing packet data transfer using serial paths. These types of computer interconnect systems have been commercially used for processors and bulk memory facilities of the VAX architecture, and provide versatile systems of high performance and reliability. Other commercially-available communications networks include the so-called Ethernet system as disclosed in U.S. Pat. No. 4,063,220, issued to Metcalfe et al, and the token ring system such as the IEEE 802.5 standard and the FDDI (fibre distributed data interface) standard. Each of these communications systems, or local area network systems, employs serial data transmission.

In most local area network systems, the serial data is transmitted using a not-return-to-zero (NRZ) convention, such as Manchester encoding. The data and clock are included in the same signal, so at the receiver the clock must be recovered before the incoming data can be interpreted. A local clock is generated in frequency and phase synchronization with the clock imbedded in the datastream, and this local clock is then employed to extract the data from the incoming signals. One example of a decoder for recovering data and clock from a self-clocked encoded signal such as a Manchester-encoded signal is disclosed in U.S. Pat. No. 4,450,572, issued to Stewart et. al. and assigned to Digital Equipment Corporation.

A coding technique used in some networks employs a NRZI convention, in which case a transition (zero-to-one or one-to-zero) indicates a "one" and the absence of a transition indicates a zero. Fibre optics systems using the FDDI standard typically use this convention. Because a string of zeros produces a coded signal having no transitions, the task of recovering the clock from this signal is much more difficult, compared to a system using Manchester coding where at least one transition occurs for every bit, whether it is a one or a zero. Usually steps are taken to assure that a "one" is transmitted every set number of bits so that a clock can be recovered, but the difficulty in generating a clock when the occurrence of a transition to sync the local clock is sporadic, is apparent.

SUMMARY OF THE INVENTION

In accordance with one embodiment of the invention, a serial data communications system employs an embedded clock which is recovered from a data signal by incrementally controlling the frequency (thus phase) of a voltage-controlled oscillator in response to the difference in phase between the incoming data signal and the clock oscillator output. A transition of the data signal is detected and used to initiate a control pulse which is terminated upon the next transition in the clock oscillator output. A reference pulse is also generated which has a width about equal to a half cycle of the clock. These pulses are used to generate the voltage control for the oscillator, so that the phase relationship varies to seek an equilibrium where the pulses are of equal width and the transitions of the clock are at midpoint of potential transitions of the data signal. The control can tolerate relatively long periods where there is no transition of the data signal. The control circuitry includes a counter for transitions of the clock to inhibit another detect operation from starting until the comparison circuit is ready to accept it.

BRIEF DESCRIPTION OF THE DRAWINGS

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

FIG. 6 shows timing diagrams of events vs. time for voltage waveforms appearing in the circuit of FIG. 5 when the phase of the oscillator leads that of the incoming data; and FIG. 7 shows timing diagrams of events vs. time for voltage waveforms appearing in the circuit of FIG. 5 when the phase of the oscillator lags that of the incoming data.

DETAILED DESCRIPTION OF SPECIFIC EMBODIMENT

Figure 1:
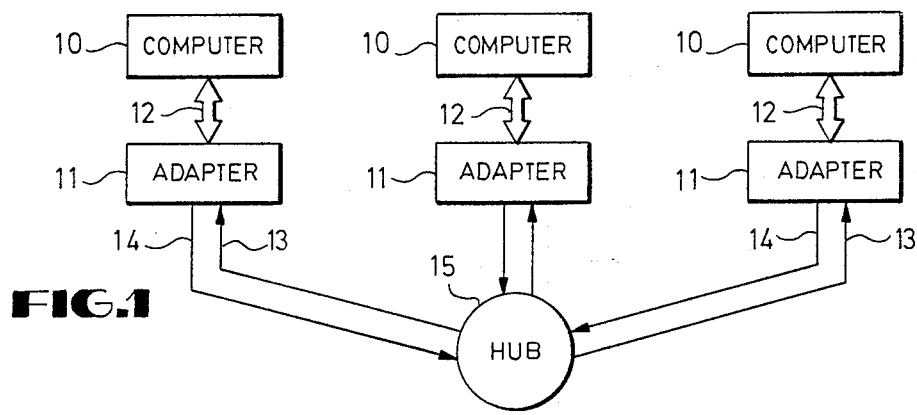
FIG. 1 is an electrical diagram in block form of a data communication system which may use features of the invention.

Referring to FIG. 1, a packet-type data communication system employing serial paths for transmit and/or receive, implementing features of the invention, is illustrated according to one embodiment having a number of CPUs 10 or similar processor-type devices which are capable of generating and receiving messages. The nodes or CPUs 10 could be disk controllers, high speed printer facilities, or other resources of this type, as well as high-performance data processors. Each one of the CPUs 10 is coupled to a communications adapter 11 by a system bus 12. In the case where the CPUs 10 employ the VAX architecture standard, for example, the busses 12 can include the same 64-bit multiplexed address/data bus and control bus which the VAX CPU uses for accessing main memory and other such local resources. In a computer interconnect system of this type, there can be a large number of these CPUs 10, several hundred or even several thousand, three being shown for simplicity. In an example embodiment, each one of the communications adapters 11 is connected to a communication path comprising a serial link, where the serial link has a serial receive line 13 and a serial transmit line 14. All of the serial links are connected to a central hub or distribution node 15. The hub 15 can be an active interconnect mechanism, in which case the hub functions as a cross-bar switch, making a direct connection between a particular one of the adapters 11 and another one as requested by an address in the message packet transmitted on one of the serial links. Alternatively, the hub 15 can be a passive device, merely connecting all of the nodes to a common bus, in which case the network may operate on a collision-sense, multiple-access (CSMA) principle. In another embodiment, the hub 15 connects all of the nodes in a closed ring so the network operates as a token ring system; each transmit line 14 is connected to the receive line 13 of the adjacent node, so each packet sent by a node will travel around the ring until it reaches the destination node.

Figure 2:
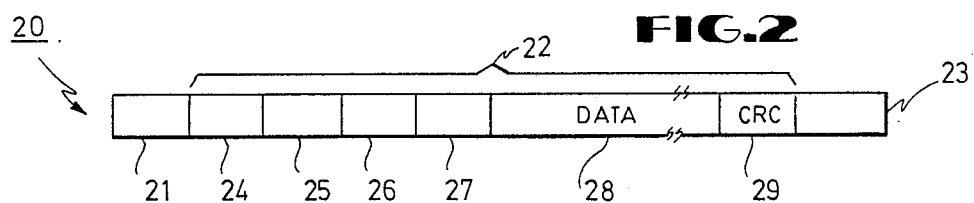
FIG. 2 is a diagram of a packet format which may be used in the computer interconnect system of FIG. 1.

The format of the message packets 20 transmitted and received on the serial links 13 and 14 in the system of FIG. 1 is set forth in FIG. 2. The packet 20 includes a sync portion 21, a header and information portion 22, and a trailer 23. The sync portion 21 and trailer 23 are added by the communications adapter 11, while the header and information packet 22 is generated in the host computer or CPU 10 for a node. The header and information portion 22 comprises an integral number of bytes which is variable in length from a few up to, in an example embodiment, several thousand. Each byte of the packet 20 is received and transmitted bit-serially on the lines 13 and 14, using a coding method as described below. The transmission rate on a serial link is, for example, about one to four Mbit/sec for low-end Ethernet or token ring systems using twisted pair cabling, and up to 70-Mbit/sec or more for computer interconnect systems of the DEC-Net type using fibre optic coupling. The sync portion 21 includes a number of bit-sync characters (e.g., 55$_{hex}$) followed by a character sync (e.g., 96$_{hex}$), and functions to allow the receiving adapter 11 to recognize the beginning of an incoming message and to regenerate a clock synched on the bit and character boundaries. Before the trailer 23 is a CRC field generated by the source node and used by the receiver node to calculate a function of all of the bits in the header and information portion 22 to check the integrity of the received data. The trailer 23 includes a number of trailer characters which merely function to designate the end of a message packet. The packets 20 are transmitted asynchronously on the serial link, separated by intervals where no signal is present on the serial link.

The packet 20 of FIG. 2 is defined according to a protocol specified for the particular type of communications network used. In a typical embodiment, the header and information portion 22 of the packet 20 includes a type or command field 24 specifying what type of message is being transmitted, followed by a length field 25 specifying the length of the message expressed as the number of bytes. An address field 26 specifies the destination address to which the CPU 10 (of the source node) requests the data be sent. The source address (the address of the node sending the data) is contained in a field 27. These addresses may be absolute addresses, or aliases, depending upon the software used. The size of the address fields determines the number of nodes that can be uniquely addressed in a network; a one-byte address field can address 256 nodes. These fields 24 to 27 constitute the "header" of the packet. Following the addresses in the packet 20 is the data field 28, which may be from zero to several thousand bytes in length. The CRC field 29 follows the data field 28 and is a calculated function of all of the fields 24-28. An acknowledge packet is of the same format as the packet 20 of FIG. 2, but it has a zero-length data field 28, and it has no length field 25; the type field 24 of an acknowledge packet has a certain code for a positive acknowledge and another code for a negative acknowledge.

The medium used to convey the data packets 20 along the serial links as illustrated in FIG. 1 may be pairs of coaxial lines 13 and 14. That is, two coaxial cables connect to each node. It is understood, however, that other media such as fibre optics or twisted-pair cabling, could be used instead. Also, it is understood that instead of employing separate receive and transmit cables 13 and 14, a single transmit/receive cable or bus may be used. Likewise, the network may include bridges to other networks, and may use interconnect arrangements at the hub 15 other than the crossbar switch mentioned.

Figure 3:
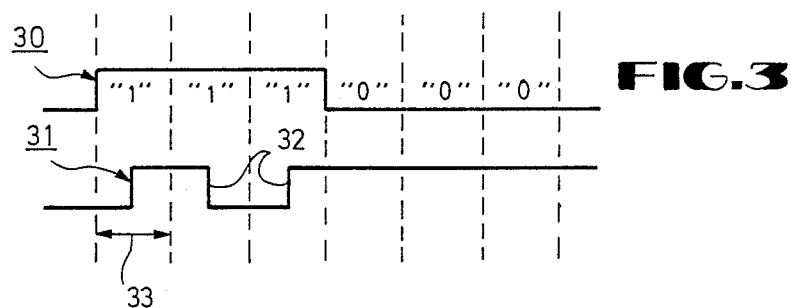
FIG. 3 is a timing diagram of voltage vs. time for encoding of data as used in one embodiment of the invention.

Referring to FIG. 3, the encoded signal used in the serial data transmission of the packets 20 of FIG. 2 employs an NRZI code which consists of a transition (zero-to-one or one-to-zero) for a logic "1" and no transition for a logic "0". Thus a binary data input 30 consisting of "111000" of FIG. 3 produces an encoded signal 31 having transitions 32 for each "1" bit and no change in the signal where the logic "0"s occur. The bit-rate of the encoded signal 31 is indicated by the clock periods 33, and it is seen that the transitions 32 occur at the center of a clock period 33. In contrast to Manchester encoding, where there is at least one transition during every clock period, it is seen that there may be many clock periods where there is no transition when this NRZI code is utilized. In order to increase the reliability of clock recovery, the codes used in packet transmission in the system of FIG. 1 will eliminate all code values that have more than a given number of successive zeros, since zeros produce no transition. For example, 5-bit codes such as "10000" and "00000" are not used in making up the code table, while all code values such as "10100", "10001", etc., are valid.

Figure 4:
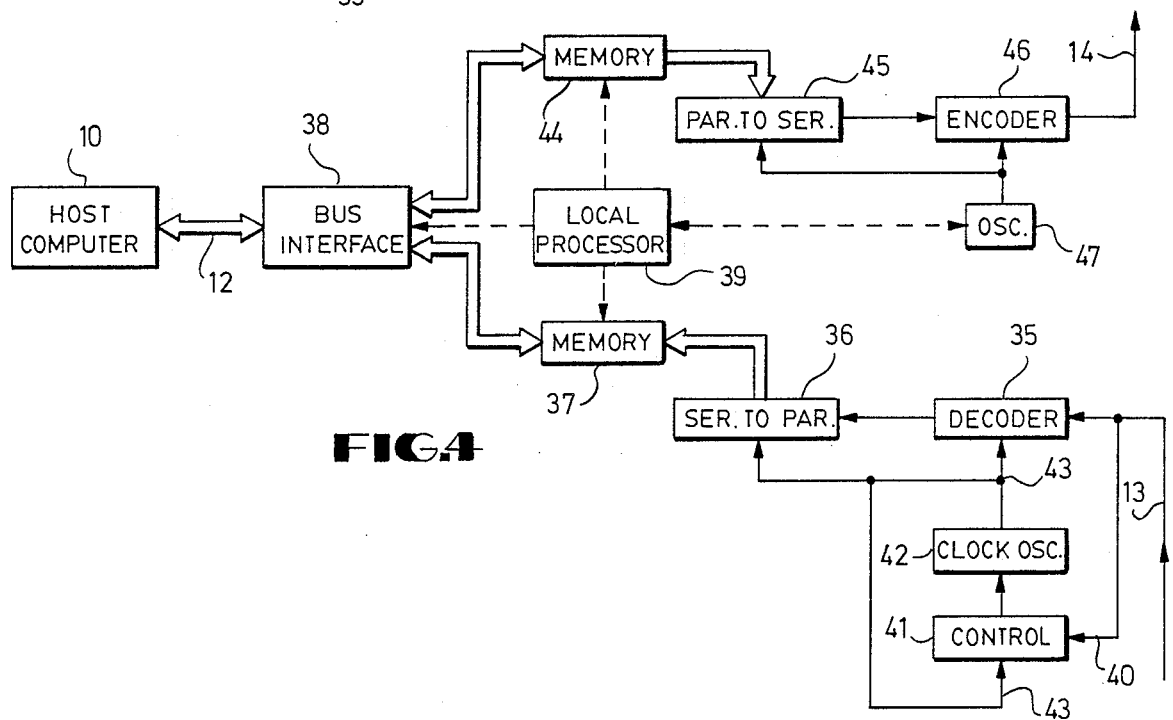
FIG. 4 is an electrical diagram in block form of a communications adapter which may be used in the system of FIG. 3.

Referring to FIG. 4, the construction of the adapter 11 in one of the nodes 10 of FIG. 1 is illustrated in more detail. The receive data line 13 is connected to a decoder 35 which converts the NRZI code used on the serial links to a standard binary code, and this binary code is converted from serial to parallel by clocking the data into a shift register 36. The shift register is loaded into a buffer memory 37 every time it is filled, and this buffer 37 is used to make the transition to the local clock; thus the buffer 37 is unloaded (asynchronously with respect to the clock of the signal on receive data line 13) via a bus interface 38 to the host computer 10. The clock used to encode the incoming signal on line 13 must be recovered in order to decode the signal, and to this end the incoming data is applied by line 40 to a clock control circuit 41 constructed according to one embodiment of the invention. This clock control circuit 41 controls the operation of a voltage controlled oscillator 42, and an output 43 of this oscillator 42 is the local clock used to operate the decoder 35 and the shift register 36. The outgoing packets on transmit line 14 go through a conversion that is the reverse of the treatment of received signals; data packets form the host computer 10 are buffered in a memory 44, converted to serial data in a parallel-to-serial converter 45 (a shift register), and converted from binary to NRZI code in a code converter circuit 46 then applied to the outgoing line 14. The transmitted signals are clocked by a local clock 47 having an output 48 applied to the converters 45 and 46; this local clock is of the same nominal frequency as the clock oscillator 42, but is not synchronized with it, in phase or frequency. The local clock 47 is also used as the clock for a microprocessor 49 employed as a local processor to control the operation of the buffers 37 and 44 and the interface 38, and, depending upon the system requirements, may be derived from the system clock of the host computer 10.

Figure 5:
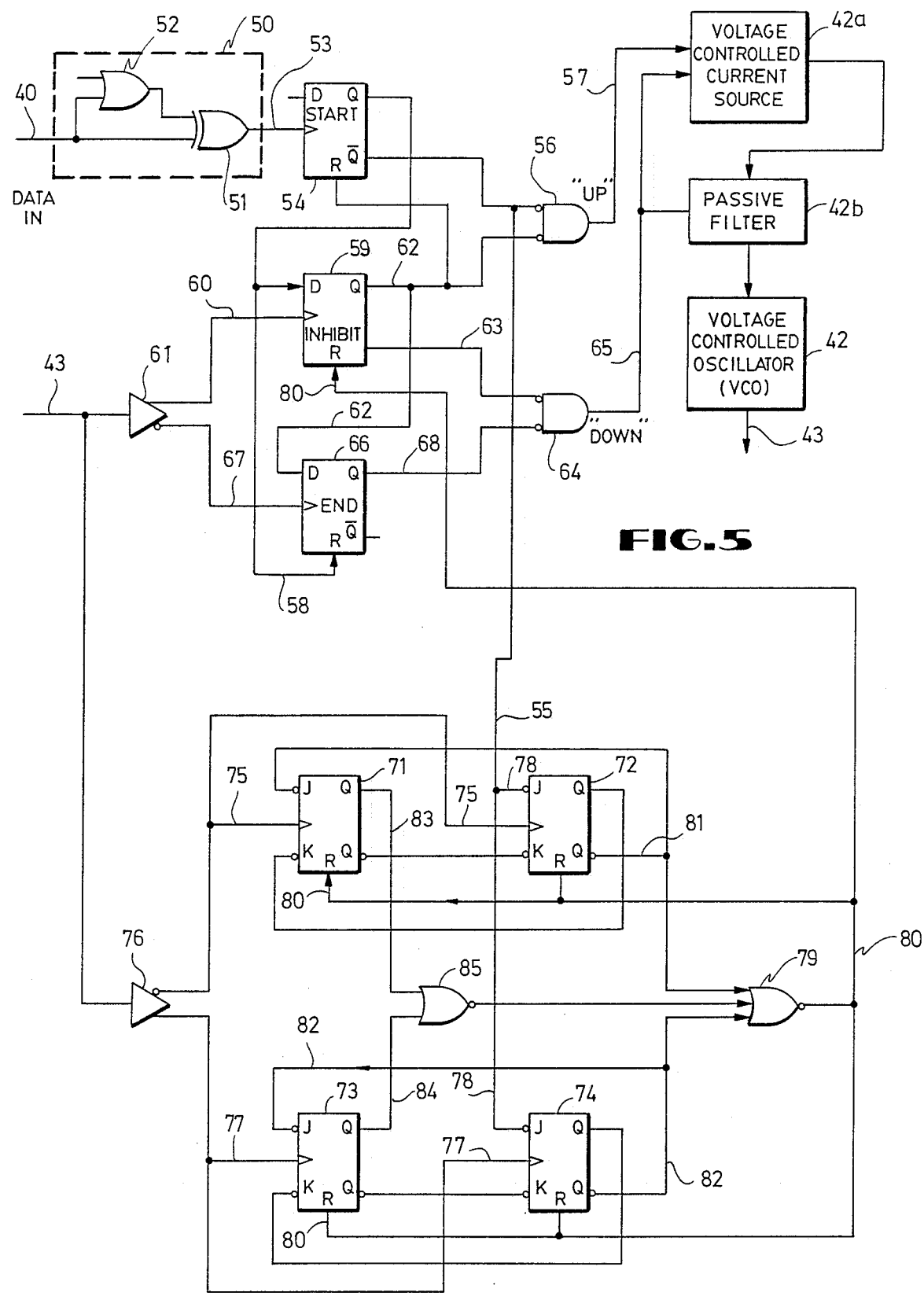
FIG. 5 is an electrical schematic diagram of a phase detector and control circuit for a VCO used in the adapter in the computer interconnect system of FIG. 1.

The clock control circuit 41 used to control the phase of the voltage controlled oscillator (VCO) 42 is shown in detail in FIG. 5. In FIGS. 6a-6i and 7a-7i, the voltage waveforms occurring in the circuit of FIG. 5 are illustrated.

The logical sequence begins with all flip flops in the negated state. The incoming data signal of FIG. 6a is first applied to an edge detector 50 of FIG. 5 which may consist of an exclusive-OR circuit 51 and a delay stage 52 (here using half of an OR gate since the circuit is made up of logic available in a gate-array). The output 53 of the edge detector 50 is a narrow pulse as seen in FIG. 6b occurring at every transition 32 of the signal. This output 53 is applied in an input of a flip-flop circuit 54, and, causes the assertion of START. The START flip flop retains the condition that a data transition has occurred and performs the following functions; it provides the UP signal to the VCO 42; it conditions the INHIBIT flip flop 59 to be set on the next asserted condition of the VCO 42; and it forces the negation of the END flip flop 66. The INHIBIT flip flop 59 is used to compare the timing of the data with the VCO 42 and controls the proportion of UP to DOWN time to be applied to the VCO 42 through the voltage controlled current source 42a and the passive filter 42b. On receiving a DATA signal, START is asserted and initiates the UP signal through the AND gate 56 of the voltage controlled current source 42a. When the assertion of VCO output 43 occurs, the INHIBIT flip flop 59 is asserted. This stops the UP signal, initiates the DOWN signal through the AND gate 64 to the voltage controlled current source 42a, and negates the START flip flop 54. The assertion of the flip flop 59 also conditions the assertion of the END flip flop 66 and, on the negation of the VCO, output 43, the END flip flop 66 asserts and stops the DOWN signal to the voltage controlled current source 42a. The passive filter 42b smoothes the current fluctuations from the voltage controlled current source 42a before sending them to the VCO 42.

The "down" pulse of FIG. 6i will thus always be of substantially fixed width, about that of a half-cycle of the oscillator output, since the "down" pulse is initiated by the rising edge of the oscillator output and terminated by the falling edge of the clock oscillator. The "up" pulse will vary in width depending upon the phase relationship between the data signal of FIG. 6a and the oscillator signal of FIG. 6c, being of about the period from a data transition to a rising edge of the oscillator output. The control circuit will seek an equilibrium point where the "up" and "down" pulses will are of equal width. These pulses function to control the phase of the oscillator 42; an "up" pulse increases the frequency of the oscillator 42 so the phase moves left in the FIGS., i.e., the rising edge occurs sooner. The "down" pulse correspondingly decreases the oscillator frequency and delays the next rising edge, so when the down pulse is wider than the "up" pulse the tendency will be to delay the rising edge of the oscillator and thus stretch out the "up" pulse.

In FIGS. 7a-7i a condition is illustrated wherein the oscillator lags the data, i.e., the oscillator frequency is too slow and the rising edge of the oscillator output of FIG. 7c does not occur until a longer delay after the transition of the data signal of FIG. 7a. In this case, the first falling edge of the oscillator output after the data transition is ignored, and the result is that the "start" signal is longer, the "inhibit" signal is shorter, and the "up" pulse of FIG. 7h is wider than the "down" pulse of FIG. 7i, so the oscillator frequency will tend to increase, again seeking the equilibrium point where the "up" and "down" pulses are equal in width.

A set of four J-K flip flops 71, 72, 73 and 74 of FIG. 5 functions to count to three and reset the phase detector circuit after the third oscillator transition following a data transition. The rising edge of the clock oscillator output 43 produces an input 77 to each of the flip flops 73 and 74 via buffer 76, and the falling-edge produces an input 75 to each of the flip flop 71 and 72. The "start" signal 55 is applied to the J inputs 78 of each of the flip flops 72 and 74, so when a data transition begins a phase detect cycle, the count-to-three cycle begins. After three transitions of the clock oscillator, gate 79 produces a "3rd-edge" output as seen in FIGS. 6g or 7g on a line 80. This output on line 80 is used to reset the "inhibit" pulse of FIG. 6e, and is also used to reset all of the flip flops 71-74. After being reset, the flip flops 71-74 won't toggle until a start pulse on line 55 occurs, after which the first two transitions will toggle the flip flops 72 and 74, producing outputs 81 and 82 to the gate 79 and back to the flip flops 71 and 73, so the next transition will toggle one of these to produce a Q output 83 or 84 to the gate 85 and thus the other input to the gate 79.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method for recovering a clock from a serial data signal, comprising the steps of:
    (a) generating a phase-controllable clock signal having two types of transitions including zero-to-one-level transitions and one-to-zero-level transitions;
    (b) detecting either one of an up or down transition of said data signal and initiating a control pulse in response thereto, then inhibiting detection of transitions of said data signal for a plurality of transitions of said clock signal following said up or down transition of said data signal;
    (c) detecting the next transition of said clock signal of only one of said two types and terminating said control pulse in response thereto; and
    (d) varying said clock signal in response to the width of said control pulse to thereby bring said clock signal into a selected phase relationship to transitions of said data signal.

2. A method according to claim 1 including the step of generating a reference pulse starting at said next transition of said clock signal and terminating at the following transition of said clock signal of the other of said two types, said step of varying being in reference to said reference pulse.

3. A method according to claim 2 including the step of integrating control pulses and reference pulses over number of transitions of said data signal.

4. A method according to claim 3 wherein said step of integrating includes applying said pulses to a voltage-controlled current source and applying the output of said current source to a passive filter, the output of said passive filter being used to vary said clock signal.

5. A method for recovering a clock from a serial data signal, comprising the steps of:
   (a) generating a phase-controllable clock signal;
   (b) detecting a transition of said data signal and initiating a control pulse in response thereto;
   (c) detecting a transition of said clock signal and terminating said control pulse in response thereto;
   (d) varying said clock signal in response to the width of said control pulse to thereby bring said clock signal into a selected phase relationship to transitions of said data signal; and
   (e) counting transitions of said clock signal after said transition of said data signal and inhibiting said detecting until a selected number is counted.

6. A method according to claim 1 wherein said data signal is an NRZI two-level signal and wherein said data signal may contain periods of no transitions during the period of a plurality of transitions of said clock output.

7. Apparatus for recovering a clock from a serial data signal having a basic transition rate but having missing transitions, comprising:
   (a) a controllable clock oscillator producing a clock output having nominally the same transition rate as said basic transition rate of said data signal;
   (b) means for detecting either one of a rising or falling transition of said data signal and initiating a control pulse in response thereto;
   (c) means for detecting a transition of said clock output following said rising or falling transition of said data signal and terminating said control pulse in response thereto; and
   (d) said clock oscillator including means for varying said clock output in response to said control pulse to thereby bring said clock output into a fixed relationship to transitions of said data signal.

8. Apparatus according to claim 7 including means for generating a reference pulse starting at said transition of said clock output and terminating at the next transition of said clock output, said reference pulse being applied to said means for varying.

9. Apparatus according to claim 7 including means for integrating control pulses and reference pulses over a number of transitions of said data signal.

10. Apparatus according to claim 9 wherein said means for integrating includes means for applying said pulses to a voltage-controlled current source and means for applying the output of said current source to a passive filter, the output of said passive filter being connected to said clock oscillator.

11. Apparatus for recovering a clock from a serial data signal, comprising:
   (a) a controllable clock oscillator producing a clock output;
   (b) means for detecting a transition of said data signal and initiating a control pulse in response thereto;
   (c) means for detecting a transition of said clock output and terminating said control pulse in response thereto;
   (d) said clock oscillator including means for varying said clock output in response to said control pulse to thereby bring said clock output into a fixed relationship to transitions of said data signal; and
   (e) means for counting transitions of said clock output after said transition of said data signal and for inhibiting said means for detecting until a selected number is counted.

12. Apparatus according to claim 7 wherein said data signal is an NRZI two-level signal.

13. Apparatus according to claim 10 wherein said data signal may contain periods of no transitions during the period of a plurality of transitions of said clock output.

14. A method of controlling the phase of a voltage-controlled oscillator producing a clock signal of a given period, in response to a data signal having a period nominally the same as said given period but having missing transitions in some transition-positions, comprising the steps of:
   (a) beginning a first control pulse upon either one of a rising or falling transition of said data signal;
   (b) ending said first control pulse and beginning a second control pulse upon a transition of said clock signal;
   (c) ending said second control pulse in response to the next transition of said clock signal; and
   (d) controlling the frequency of said oscillator in response to the relative widths of said first and second control pulses.

15. A method of controlling the phase of a voltage-controlled oscillator producing a clock signal, in response to a data signal, comprising the steps of;
   (a) beginning a first control pulse upon a transition of said data signal;
   (b) ending said first control pulse and beginning a second control pulse upon a transition of said clock signal;
   (c) ending said second control pulse in response to the next transition of said clock signal;
   (d) controlling the frequency of said oscillator in response to the relative widths of said first and second control pulses; and
   (e) counting a selected number of said transitions of said clock signal after the beginning of said first control pulse before beginning another said first control pulse.

16. A method according to claim 14 wherein said voltage-controlled oscillator seeks an equilibrium in which said first and second control pulses are equal in width.

17. A method according to claim 14 wherein said data signal includes periods of time with no transitions exceeding the time of two transitions of said clock signal.

18. A method according to claim 1 wherein said data signal includes periods of time with a transition for every transition of said clock signal, and other periods of time with no transitions, at least some of said other periods exceeding the time for two transitions of said clock signal.

19. Apparatus according to claim 7 wherein said data signal includes periods of time with a transition for every transition of said clock signal, and other periods of time with no transitions, at least some of said other periods exceeding the time for two transitions of said clock signal.

20. A method for recovering a clock from a serial data signal having a given clock period where transitions may occur but need not occur, comprising the steps of:
   (a) generating a phase-controllable clock signal having the same period as said given clock period;

(b) detecting either one of a rising or falling transition of said data signal and initiating a control pulse in response thereto;

(c) detecting a transition of said clock signal and terminating said control pulse in response thereto; and (d) varying said clock signal in response to said control pulse to bring said clock signal into a selected phase relationship to transitions of said data signal.

21. A method according to claim 20 including the step of generating a reference pulse starting at said transition of said clock signal and terminating at the next transition of said clock signal, said step of varying being in reference to said reference pulse.

22. A method according to claim 21 including the step of integrating control pulses and reference pulses over a number of transitions of said data signal.

23. A method according to claim 22 wherein said step of integrating includes applying said pulses to a voltage-controlled current source and applying the output of said current source to a passive filter, the output of said passive filter being used to vary said clock signal.

24. A method according to claim 20 including the steps of counting transitions of said clock signal after said transition of said data signal and inhibiting said detecting until a selected number is counted.

25. A method according to claim 20 wherein said data signal is an NRZI two-level signal and wherein said data signal may contain periods of no transitions during the period of a plurality of transitions of said clock signal.

* * * * *